United States Patent
Decocq et al.

(10) Patent No.: US 10,787,557 B2
(45) Date of Patent: Sep. 29, 2020

(54) ODORLESS POLYESTER STABILIZER COMPOSITIONS

(71) Applicant: Hexion Inc., Columbus, OH (US)

(72) Inventors: Françoise Decocq, Ottignies Louvain-la-Neuve (BE); Denis Heymans, Ottignies Louvain-la-Neuve (BE)

(73) Assignee: HEXION INC., Columbus, OH (US)

( * ) Notice: Subject to any disclaimer, the term of this patent is extended or adjusted under 35 U.S.C. 154(b) by 39 days.

(21) Appl. No.: 15/743,200

(22) PCT Filed: Jul. 12, 2016

(86) PCT No.: PCT/EP2016/001202
§ 371 (c)(1),
(2) Date: Jan. 9, 2018

(87) PCT Pub. No.: WO2017/008903
PCT Pub. Date: Jan. 19, 2017

(65) Prior Publication Data
US 2019/0119466 A1  Apr. 25, 2019

(30) Foreign Application Priority Data
Jul. 10, 2015 (EP) .................................. 15075022

(51) Int. Cl.
*C08K 5/1515* (2006.01)
*C08K 5/101* (2006.01)
*C08L 67/02* (2006.01)
*C08G 63/183* (2006.01)

(52) U.S. Cl.
CPC .......... *C08K 5/1515* (2013.01); *C08G 63/183* (2013.01)

(58) Field of Classification Search
None
See application file for complete search history.

(56) References Cited

U.S. PATENT DOCUMENTS

| | | | |
|---|---|---|---|
| 6,433,217 B1 * | 8/2002 | Rosenbrand | C07D 303/16 560/263 |
| 2012/0095244 A1 | 4/2012 | Gouman et al. | |
| 2012/0227801 A1 * | 9/2012 | Brennan | C08G 63/916 136/256 |
| 2013/0006001 A1 * | 1/2013 | Muppa | C07D 303/48 549/531 |
| 2014/0364635 A1 * | 12/2014 | Sun | C07D 303/16 549/520 |

FOREIGN PATENT DOCUMENTS

WO   WO 2011/030098 A1   3/2011
WO   WO 2012/120260 A1   9/2012

OTHER PUBLICATIONS

"Technical Data Sheet Re-issued Jan. 2015 Cardura(TM) E10P Glycidyl Ester", Jan. 31, 2015, XP055232572, Retrieved from the Internet.

\* cited by examiner

*Primary Examiner* — Tae H Yoon

(57) ABSTRACT

The invention relates to compositions of glycidyl ester in C9 to C15 branched acid is with a concentration in compounds, which have a boiling point below 250° C., of less than 8000 ppm. Such a composition are specially useful as stabilizer of thermoplastic extruded polymer; It has been demonstrated that such composition are generating low or' no unpleasant odour at the outlet of the extruder.

8 Claims, No Drawings

ODORLESS POLYESTER STABILIZER COMPOSITIONS

RELATED APPLICATION DATA

This application claims the benefit of PCT Application PCT/EP2016/001202 with an International Filing Date of Jul. 12, 2016, published as WO 2017/008903 A1, which further claims priority to European Patent Application No. EP 15075022.2 filed Jul. 10, 2015; the entire contents of both are hereby incorporated by reference.

FIELD OF INVENTION

The present invention relates to a composition of glycidyl ester used as stabilizer in thermoplastic polyesters with reduced odor generation during the extrusion of the stabilized polyester resin in a film or a fiber. The invention also relates to a composition including glycidyl ester and thermoplastic polyesters.

BACKGROUND OF INVENTION

Polyester materials are widely used as extrusion and molding resins for applications such as fibers, films, automotive parts, food packaging, beverage containers, and the like. Commonly used polyesters include poly(ethylene terephthalate), herein abbreviated as "PET", poly(1,4-butylene terephthalate), herein abbreviated as "PBT", poly(1,3-propylene terephthalate), herein abbreviated as "PTT", and poly(1,4-cyclohexylene dimethylene terephthalate), herein abbreviated as "PCT". PET polymers are widely used because of their availability and modest price. PET polymers have relatively good heat resistance in dry conditions but tend to degrade readily under moist conditions or at elevated temperatures. Similarly, PET fibers, yarns, and fabrics are known to exhibit excellent dimensional stability, that is, low shrinkage or growth during service. Although PET has a high resistance to thermal degradation, PET fibers can exhibit loss of tensile strength under continuous exposure to humidity and/or elevated temperatures. Because of these limitations, PET polymers have limited usefulness in certain durable and semi-durable applications which require elevated temperatures, such as, for example, paper making machine clothing, dryer felts, industrial belts, high temperature tape backing, filter media for hot air or liquid filtration, autoclavable products, and other applications involving extended exposure to steam or superheated steam.

Efforts to remedy this problem have been directed to producing a high molecular weight linear polyester having a low content of free carboxyl groups. One approach is to reduce the number of free carboxyls by the use of "end-capping agents", such as diazomethane, as disclosed by U.S. Pat. No. 3,051,212, or carbodiimides, as disclosed by U.S. Pat. Nos. 3,975,329 and 5,169,499, which react with the free carboxyl groups and thereby prevent their further reaction. These end-capping materials, however, are expensive, often toxic.

Polyester compositions containing epoxides are known (see, for example, U.S. Pat. Nos. 3,657,191; 3,627,867; 3,869,427; 4,016,142; 4,130,541; 4,115,350; 3,560,605; 4,374,960. The addition of epoxides to polyesters, however, can be problematic. For example, the epoxides may show a low reactivity which, in turn, can create processing and operational difficulties and give uncertain results. For example, U.S. Pat. No. 3,869,427 discloses that styrene oxide appears to increase the level of carboxyl groups when added to molten PET and that diepoxides are "unsuitable for the formation of fibers". Various polyester blends and composites in combination with epoxides also are described, for example in U.S. Pat. Nos. 4,348,500 and 4,222,928. Such blends, however, are expensive and can require complicated processing. In addition, reinforced polymer composites are not suitable for the preparation of fibers. Thus, the compositions described in the above references do not adequately address the inherent susceptibility of PET to hydrolysis or provide compositions which show excellent stability to high temperatures under both dry and moist conditions. Polyester compositions containing glycidyl ester of branched carboxylic acid are known from NL6814541, or U.S. Pat. No. 4,152,318 and more recent from EP 2 475 704, the use of those glycidyl ester are providing polyester film, fibers, or casted material with a very good resistance in hot and humid conditions.

However, it has been experienced that during the process of blending the polyester resin and the glycidyl ester of branched carboxylic acid in the extruder at high temperature it generates unpleasant odors and fumes. The industry is looking to a composition that will lead to the same end performance of the polyester based product but without the issue of odors generated during the processing.

After an investigation of the issue that was reported with the use of glycidyl ester of a branched carboxylic acid that has from 5 to 50 carbon atoms (see EP 2 475 704), we have found that a glycidyl ester of branched carboxylic acid that has a content of C5, C6 and C7 glycidyl esters lower than 2500 ppm the issue of the odor during the high temperature processing is solved.

DISCLOSURE OF THE INVENTION

Accordingly, the invention provides a process for the manufacture of polyester composition such as films or fibers.

More in particular the invention relates to the compositions of aliphatic tertiary saturated carboxylic acids or $\alpha,\alpha$-branched alkane carboxylic acids, which contain mostly 9 to 15 carbon atoms and which provide glycidyl esters with a branching level of the alkyl groups depending on the olefin feedstock used and/or the oligomerisation process thereof, and which is defined as below. Example of such branched acids include Versatic acid 10 from Hexion chemicals and Neodecanoic acids from Exxonmobil.

It is generally known from e.g. U.S. Pat. Nos. 2,831,877, 2,876,241, 3,053,869, 2,967,873 and 3,061,621 that mixtures of $\alpha,\alpha$-branched alkane carboxylic acids can be produced, starting from mono-olefins, carbon monoxide and water, in the presence of a strong acid.

The glycidyl esters can, for example, be obtained according to PCT/EP2010/003334 or the U.S. Pat. No. 6,433,217.

From the above literature it is clear that the $\alpha,\alpha$-branched alkane carboxylic acid consists of a mixture of acids that contain acids with 4 to above 13 carbon atoms in total.

TABLE 1

Typical Composition of a commercially $\alpha,\alpha$-branched alkane carboxylic acid

| Product | Quantity in % m/m |
|---|---|
| <C5 | 0.07 |
| C5 | 0.10 |
| C6 | 0.31 |
| C7 | 0.35 |

TABLE 1-continued

Typical Composition of a commercially α,α-branched alkane carboxylic acid

| Product | Quantity in % m/m |
|---|---|
| C8 | 0.13 |
| C9 + 10 + 11 | 94.26 |
| >C11 | 4.78 |

The commercially α,α-branched alkane carboxylic acid with the above composition can be used in combination with thermoplastic polymer and for example with PET to provide a excellent resistance to hydrolysis, but due to the extrusion conditions at high temperature (>260° C.) products are vaporized generating unpleasant and disturbing odour, fumes and film defects. We found that by reducing the level of "volatile" compounds the unpleasant and disturbing odour are not detected anymore.

The preferred composition of a glycidyl ester in C9 to C15 branched acid is with a concentration in compounds, which have a boiling point below 250° C., of less than 8000 ppm, preferably 2000. This composition help to reduce the odour during the processing of the PET at high temperature, this effect is not predictable from the prior art. The quantification of the odours was done according to the method as given below.

A composition of glycidyl ester of branched carboxylic acid in C9 to C15 containing less than 8000 ppm of organic compounds which have a boiling point below 250° C.

A composition of glycidyl ester of branched carboxylic acid in C9 to C15 containing less than 2000 ppm of organic compounds which have a boiling point below 240° C.

The above composition have olfactometry odour concentration is of $250[uo_E/m^3]$ or lower when quantified as described below.

The above composition can be as stabilizer for extruded thermoplastic polymer characterized in that the olfactometry odour concentration is of $250[uo_E/m^3]$ and lower. The thermoplastic polymer could be a poly-olefin, a halogenated poly-olefin or a polyester.

When the thermoplastic is a polyester polymer it could be based on polyester polymer comprise poly(ethylene terephthalate), or poly(1,4-butylene terephthalate), or poly(1,3-propylene terephthalate), or poly(1,4-cyclohexylenedimethylene terephthalate), or a combination thereof, the most preferred of this polyester will comprise poly(ethylene terephthalate).

EXPERIMENTAL

Preparation of the (Purified) Glycidyl Neodecanoate Samples

Sample L

About 300 ml of the glycidyl neodecanoate of comparative example P were placed in a round bottom flask and fitted to a rotary evaporator (rotavap). The rotating system was heated to approximately 118° C. and put under technical vacuum. A light fraction representing about 150 g was removed from the sample in this way. The remaining was kept as sample L.

Samples M1 and M2

The sample of glycidyl neodecanoate was topped on a continuous distillation unit equipped with: a continuous distillation unit equipped with a high performance sulzer packed low pressure drop distillation equipment, a reflux unit, a boiler and operated under high vacuum. A fraction of 5% (M1) or 8% (M2) of the product was removed via the top of the column and the remainder was kept for testing in polyethylene terephtalate. The average residence time of the glycidyl neodcanoate in the column was less than 45 minutes. The bottom temperature of the column was kept below 200° C.

Gas Chromatograph Specification

The equipment characteristic and the gas chromatograph condition are described in the table here below.

| | Equipment | |
|---|---|---|
| Apparatus | Model | Thermo scientific TRACE 1310 |
| | Autosampler for direct injection | AI 1310 |
| | vector gas | $N_2$ |
| Pre-column | Type | Polar seactivated guard column |
| | Supplier | Restek |
| | Stationary phase | Polar polyethylene glycol deactivation |
| | Lengh | 5 m |
| | Internal diameter | 0.25 mm |
| | Maximum temperature | 280° C. |
| Column | Type | RTX 1701 |
| | Supplier | Restek |
| | Stationary phase | PDMS apolar |
| | Lengh | 30 m |
| | Internal diameter | 0.25 |
| | Maximum temperature | −20° C.-280° C. |
| Software | Chromeleon | |

Gas Chromatograph—Temperature Profile

| Temperature program | |
|---|---|
| Initial temperature | 60° C. |
| Hold | 5 min |
| Rate 1 | 3° C./min |
| Temperature 1 | 210° C. |
| Hold 1 | 5 min |
| Rate 2 | 20° C./min |
| Temperature 2 | 270° C. |
| Hold 2 | 5 min |
| Total duration | 68 min |

Sample Preparation

Weight with an accuracy of 0.01 mg approximately 0.12 g of glycidyl ester into a 30 mL flask. Add approximately 13 g of THF with the same accuracy. The mixture is stirred until a homogeneous solution is obtained. A few milliliters of this solution are then filtered with a 0.45 μm filter. A known volume of filtered sample (between 300 and 500 μL) is finally mixed, directly into a vial, with the same volume of internal standard solution, in order to be analyzed.

Analysis

1. Odorous Compound

| Product name | CAS | Retention time |
|---|---|---|
| Octanal | 124-13-0 | 11,468 |
| Decanal | 112-31-2 | 20,680 |
| Acetophenone | 98-86-2 | 16,383 |
| Butyric Acid | 107-92-6 | 21,675 |
| Ethanol, 2-(2-butoxyethoxy) | 112-34-5 | 6,710 |
| Glycidyl pivalate | 128969-92-6 | 15,330 |

Analysis of the Samples by Gas Chromatography

| Impurities content [% area]<br>(CAS number) | P | O | L | D | S | M1 | M2 |
|---|---|---|---|---|---|---|---|
| Unidentified peak at RT 19.88 | 0.212 | 0.078 | 0.005 | 0.099 | 027 | 0 | 0 |
| Unidentified peak at RT 23.18 | 0.099 | 0.104 | 0.0089 | 0.095 | 0.095 | 0 | 0 |
| Unidentified peak at RT 24.231 | 0.041 | 0.082 | 0.0003 | 0.0396 | 0.05 | 0 | 0 |
| Unidentified peak at RT 30.69 | 1.82 | 1.12 | — | 1.90 | 2.72 | 0.06 | 0.104 |
| Glycidyl pivalate (128969-92-6) | 0.068 | 0 | 0 | 0 | 0 | — | — |

The samples P and O are commercial products from Hexion Inc., D and S are commercial products from Daido and Shivena and all are comparative examples in this invention.

Preparation of PET Samples

Ingredients:

PET: Lighter C93 from Equipolymers

Antioxydant: Irganox 1010 (Pentaerythritol tetrakis(3-(3, 5-di-tert-butyl-4-hydroxyphenyl)propionate) from BASF Each sample contained PET, 500 ppm of Irganox 1010 and either 750 ppm or 10 000 ppm of glycidyl neodecanoate.

Twin Screw Extrusion

PET and the additives have been first dried overnight using dehumidifying dryer from Piovan and vacuum oven, respectively. Then, dry blends have been prepared and fed into a co-rotating twin-screw extruder (TSE) through gravimetric feeder, followed by air cooling and pelletizing. Extrusion temperature typically ranged from 260 to 280° C.

Table 2 shows the screw design of the TSE from Labtech (D=26 mm, L/D=44). TSCS and IKD refer to conveying and mixing elements, respectively.

TABLE 2

Description of the Labtech screw design

| Type & number of element | Angle (°) | Length (D) | Total length (D) |
|---|---|---|---|
| TSCS 9 × 1D |  | 9 | 9 |
| IKD 1 × 0.25D | 0 | 0.25 | 9.25 |
| IKD 6 × 0.25D | 30 | 1.5 | 10.75 |
| IKD 8 × 0.25D | 60 | 2 | 12.75 |
| TSCS 1 × 2D |  | 2 | 14.75 |
| TSCS 1 × 1D |  | 1 | 15.75 |
| TSCS 1 × 1D |  | 1 | 16.75 |
| IKD 1 × 0.25D | 0 | 0.25 | 17 |
| IKD 12 × 0.25 | 30 | 3 | 20 |
| TSCS 1 × 2D |  | 2 | 22 |
| TSCS 1 × 1D |  | 1 | 23 |
| TSCS 1 × 1D |  | 1 | 24 |
| IKD 1 × 0.25D | 0 | 0.25 | 24.25 |
| IKD 8 × 0.25D | 30 | 2 | 26.25 |
| TSCS 4 × 1D |  | 4 | 30.25 |
| IKD 1 × 0.25D | 0 | 0.25 | 30.5 |
| IKD 10 × 0.25D | 60 | 2.5 | 33 |
| TSCS 9 × 1D |  | 9 | 42 |
| TSCS 1 × 0.5D |  | 0.5 | 42.5 |
| TSDS 1 × 1.5D |  | 1.5 | 44 |

Extrusion parameters are shown in the next table which highlights that the TSE is composed of ten separated heating zone and the die (Table 3).

TABLE 3

Extrusion parameters used for compounding experiments

|  | Die | Z10 | Z9 | Z8 | Z7 | Z6 | Z5 | Z4 | Z3 | Z2 | Z1 |
|---|---|---|---|---|---|---|---|---|---|---|---|
| Setup (° C.) | 260 | 265 | 265 | 265 | 270 | 275 | 275 | 275 | 280 | 280 | 280 |
| Actual (° C.) | 260 | 265 | 265 | 265 | 270 | 275 | 275 | 275 | 280 | 280 | 275 |
| Melt (° C.) | 260 |  | 265 |  | 273 |  | 273 |  | 268 |  |  |

TABLE 3-continued

Extrusion parameters used for compounding experiments

|  | Die | Z10 | Z9 | Z8 | Z7 | Z6 | Z5 | Z4 | Z3 | Z2 | Z1 |
|---|---|---|---|---|---|---|---|---|---|---|---|
| Torque | 50-55% | | | | | | | | | | |
| Screw Speed | 90 rpm | | | | | | | | | | |
| Feeder | 9 kg/h | | | | | | | | | | |
| Die Pressure | 20-30 bars | | | | | | | | | | |
| Pelletizer speed | 5 m/min | | | | | | | | | | |

Collection of Air Samples and Analysis of Organic "Volatile" Products

For each blend, a purge was done during the first 15 minutes. After this purge, air samples were collected close to the extruder in Tedlar bags (according to NF-X 43-104, with "depressurised lung") for the olfactometry and hedonic assessment was performed.

Olfactometry Measurement

Accurate and objective odour quantification can be performed according to the European standard EN 13725 which describes a method based on dynamic olfactometry at detection threshold with human assessors. 4 to 5 panel members previously calibrated in regard to their sensitivity to n-butanol were selected. Three rounds of olfactometric measurement were performed for each sample. Calculation of the odour level was done according to the standard, on maximum 15 ITE or Individual Threshold Estimates (3 rounds×5 panellists). The odour assessment was performed the day after the samplings. Results are expressed in odour units $[uo_E/m^3]$.

Hedonic Evaluation

The preferences or hedonic main lines involve consumer's expression, without any analytical description. It is related only to the hedonic feeling of products, more or less pleasant, taking into account all cultural and individual background, which reminds to customers. It may be linked with fashion and personal souvenirs or history, for instance and as a consequence, it is highly subjective. For each presentation, the panel members (8 men and 4 women; total 12) were asked to rate the sample on the following scale:

5 very pleasant and attractive
4 more pleasant
3 pleasant
2 more acceptable
1 acceptable (weak pleasantness)
0 neutral
−1 very weak unpleasantness
−2 weak unpleasantness
−3 unpleasant
−4 disturbing
−5 unbearable Results

| | Level of glycidyl ester | Hedonic character Number of panel member rating | | | | | | Sum product Hedonic character | Olfactometry odour conc. [$uo_E/m^3$] |
|---|---|---|---|---|---|---|---|---|---|
| Rating Scale | | 0 | −1 | −2 | −3 | −4 | −5 | | |
| Blanco | 0 | 0 | 3 | 5 | 4 | 0 | 0 | −25 | 320 |
| Sample P | 750 | 0 | 3 | 3 | 3 | 3 | 0 | −30 | 350 |
| Sample O | 750 | 0 | 6 | 3 | 2 | 1 | 0 | −22 | 470 |
| Sample L | 750 | 2 | 7 | 3 | 0 | 0 | 0 | −13 | 190 |

Sum product Hedonic character is equal to the value of the rating scale multiplied by the number of members giving this value and that over the all scale.

Example for sample L

Sum product=(2×0)+(7×−1)+(3×−2)=−13.

Results above clearly show that both for the hedonic character and for the olfactometry sample L has a superior performance to the comparative samples.

We claim:

1. A blend, comprising:
a thermoplastic polymer; and,
a composition comprising distilled glycidyl esters of C9 to C15 branched carboxylic acids, wherein the composition contains less than 8000 ppm of organic compounds having a maximum boiling point of 250° C., wherein the composition comprises from 50 to 80 000 ppm of the blend, wherein the olfactometry odour concentration of the blend is 250 $uo_E/m^3$ or lower.

2. The blend of claim 1, wherein the composition comprises glycidyl esters of C10 to C13 branched carboxylic acids, wherein the composition contains less than 2000 ppm of organic compounds having a maximum boiling point of 240° C.

3. The blend of claim 2, wherein the composition contains less than a total of 1500 ppm of glycidyl ester of C5, C6 and C7.

4. The blend of claim 1, wherein the thermoplastic comprises a polyester polymer.

5. The blend of claim 4, wherein the thermoplastic comprises a polyester polymer comprising poly(ethylene terephthalate), or poly(1,4-butylene terephthalate), or poly(1,3-propylene terephthalate), or poly(1,4-cyclohexylenedimethylene terephthalate), or a combination thereof.

6. The blend of claim 5, wherein that the polyester polymer comprise poly(ethylene terephthalate).

7. The blend of claim 5, wherein the glycidyl esters comprise glycidyl neodecanoate.

8. The blend of claim 1, further comprising an antioxidant.

* * * * *